Figures 1, 2:
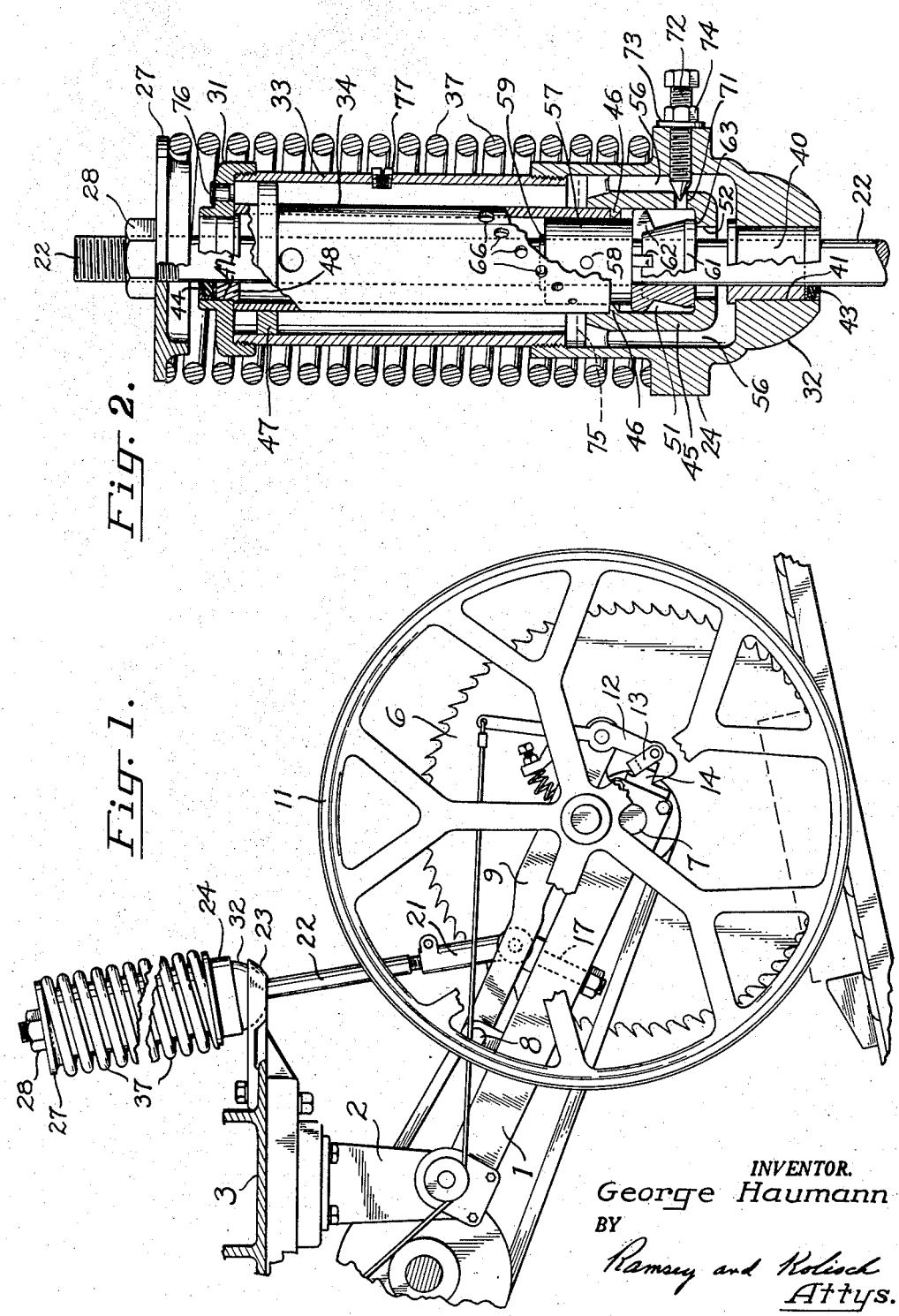

April 14, 1959 G. HAUMANN 2,882,039
SHOCK ABSORBING MECHANISM
Filed April 15, 1957

INVENTOR.
George Haumann
BY
Ramsey and Kolisch
Attys.

2,882,039
Patented Apr. 14, 1959

2,882,039

SHOCK ABSORBING MECHANISM

George Haumann, Portland, Oreg., assignor to Irvington Machine Works, Inc., a corporation of Oregon Application April 15, 1957, Serial No. 652,725

7 Claims. (Cl. 267—1)

This invention relates to shock absorbing devices and more particularly to shock absorbing devices of the type such as may be used for mounting dependently supported mechanisms which are subjected to repeated vibrations and oscillatory movement. Exemplary of mechanisms with which the shock absorbing devices of this invention may be employed are the so-called trimmer saw mechanisms used to trim the ends of lumber pieces or to cut out imperfections from intermediate portions of pieces of lumber.

Conventionally a trimmer saw mechanism of this description comprises a power actuated saw having an associated rider wheel spaced laterally from the saw and axially aligned with the saw. The rider wheel has a larger diameter than the saw with which it is associated and serves to ride over and to lift the saw connected to the rider wheel so as to prevent the saw from cutting a piece of lumber passed beneath the saw mechanism. The trimmer saw mechanism includes means for disengaging the saw from its rider wheel when it is desired to make a cut, the rider wheel passing up over the lumber while the saw cuts through the lumber.

Considerable difficulties have been experienced in trimming lumber due to the bounce and vibrations imparted to the trimmer mechanism by the rider wheel passing over the pieces of lumber passed in sequence beneath the wheel. For instance, excessive bounce and oscillatory movement has limited the speed with which successive pieces of lumber may be passed beneath the saws. Further, bouncing and oscillatory movement of the saw and its rider wheel tend to cause crushing and destruction of the lumber particularly if the lumber is relatively thin. In addition to the above, excessive wearing of the parts in the saw mechanism tends to occur.

An object of this invention is to provide an improved shock absorber device having a work supporting member wherein the work supporting member yields rapidly and easily in one direction in response to an abrupt external force exerted in that direction upon the member and wherein the work supporting member subsides to its original position smoothly and quickly and without appreciable vibrational movement of the member when the external force is removed. The shock absorber mechanism is characterized by a novel construction which enables the work supporting member to settle back initially at a fairly fast rate, the rate of subsidence gradually decreasing as the work supporting member approaches its base or rest position.

Generally, the shock absorbing device of the present invention includes a rod member or bar which comprises the work supporting member in the device, mounted for reciprocation within a casing or housing. A valve member or part is provided within the casing mounted for a limited amount of movement in a valve cavity formed in the interior of the casing. The rod member is equipped with a piston element movable in a piston chamber and secured to the rod member against axial movement relative thereto. When a dislocating external force is applied to the rod member, the piston element moves up in the piston chamber and functions to draw hydraulic fluid past the valve part and valve cavity into the piston chamber. The rod member moves from an extended to a retracted position under the impetus of the force delivered thereto, and the valve part moves so as to open up conduit means supplying fluid to the portion of the piston chamber vacated by the piston element. When the dislocating force applied to the rod member is discontinued, the valve part moves so as to close the conduit means, and movement of the rod member and piston element back to their original position causes the hydraulic fluid within the piston chamber to be expelled through a series of fluid return passages arranged with their inlet ends communicating with the interior of the piston chamber. The inlet ends of the return passages are arranged longitudinally along the piston chamber so that as the piston element moves back, hydraulic fluid is forced through an increasingly diminishing number of discharge or fluid return passages. A feature of this invention is the provision of fluid return passages which have increasingly smaller sizes, progressing in the direction the piston element travels in returning to its original position.

The valve cavity is provided with an adjustable metering valve connecting the valve cavity to the fluid reservoir supplying the hydraulic fluid. The adjustable metering valve provides a means for regulating the discharge of hydraulic fluid from the valve cavity and the piston chamber into the fluid reservoir.

An important feature of this invention is the construction wherein the valve part in its base or closed position provides a support for the piston and thereby the rod member affixed to the piston when the rod occupies its extended position. With a dependently supported working mechanism such as a trimmer saw mechanism, it is desirable that the saw mechanism be stationed during the intervals that lumber is not passing beneath the mechanism at a fixed, lowered position relative to the conveyer mechanism for transporting the lumber. This is so that the rider wheel will be in its optimum position to ride over a piece of lumber advanced thereunder, and the saw when disengaged from the rider wheel will be in an optimum position for cutting the lumber. The setting of this lowered position should also be correlated with the adjustment of the operating parts of the shock absorber so that in this position, the shock absorber parts all are in their base or rest positions. By the construction contemplated, the operating parts of the shock absorber are assured of being in their rest or base positions whenever the dependently supported mechanism carried by the shock absorber is positioned in its operating or lowered position.

Compression spring means are provided between the casing of the shock absorber and the rod member carrying the dependently supported work mechanism for the purpose of approximately counterbalancing the weight of the dependently supported mechanism. Ordinarily, the weight of the dependently supported work mechanism will act on the rod member carrying the same to urge it downwardly relative to the shock absorber casing. The force of the compression spring urging the rod member upwardly relative to the casing is adjusted to be just slightly less than the weight of the work mechanism supported on the rod member. This adjustment enables the rod member and work mechanism supported thereon to yield and move upwardly with a very slight amount of upward force exerted on the work mechanism.

Another object of this invention, therefore, is to provide a shock absorber mechanism having a valve part controlling the flow of fluid in the mechanism wherein the valve part in its rest or base position provides a support determining the rest position of a piston element pumping the fluid in the mechanism and thereby the base or rest position of a work supporting member secured to the piston element.

Another object of this invention is to provide a shock absorber of the type described having a series of return passages for the exhaust of fluid from the piston chamber of the shock absorber which includes an adjustable metering valve for augmenting the exhaust of fluid from the piston chamber of the device.

These and other objects are attained by the present invention which is described hereinbelow in conjunction with the accompanying drawings wherein:

Fig. 1 is a side view of a trimmer saw mechanism dependently supported by the shock absorber mechanism of this invention, illustrating the shock absorber in its base or rest position; and Fig. 2 is a more detailed section view of the shock absorber mechanism illustrated in Fig. 1.

In the drawings wherein an embodiment of this invention is illustrated, the shock absorber mechanism is shown in conjunction with a dependently supported trimmer saw although, of course, the shock absorber has utility as a supporting device for other work mechanisms. Referring to the drawings, and more particularly to Fig. 1, the trimmer saw mechanism illustrated comprises a swingable ladder 1 supported by a bracket 2 secured to a frame member 3 running transversely across the conveyor mechanism transporting lumber into the path of the trimmer saw. A circular saw 6 is rotatably mounted on a saw arbor 7 carried at the free or nonpivoted end of ladder 1. Pivoted intermediate the ends of ladder 1 at pivot 8 is an auxiliary arm 9, and at the free end or lower end of arm 9, a rider wheel 11 is journaled. Means are provided to disconnectably latch the lower end of auxiliary arm 9 in position approximately parallel to and adjacent ladder 1, these means including latch 12, pivotable bracket 13, and shoulder 14. When the auxiliary arm and ladder are latched together, rider wheel 11 and circular saw 6 are carried in unison over a piece of lumber advanced under the rider wheel so that the lumber is left intact without being severed by saw 6. Disconnecting auxiliary arm 9 from ladder 1 permits the rider wheel to swing upwardly about pivot 8 relative to ladder 1. In this instance, when a piece of lumber is advanced beneath the rider wheel, circular saw 6 cuts through the lumber, and rider wheel 11 rides up and over the piece of lumber. The mechanism described so far is conventional and well-known. Reference is made to United States Patent No. 2,711,197 issued to Edwin W. De Koning, June 21, 1955, for a detailed explanation of a trimmer saw mechanism of the type illustrated.

Pivotally connected to ladder 1 intermediate the ends of the ladder, as by an eye bolt 17 and a pivot pin, is a connecting tube section 21. The upper end of connecting tube section 21 is affixed to a rod member 22 extending upwardly from the connecting tube section through the center of a cupped bracket 23 affixed to frame member 3.

Rod member 22 is slidably received within a shock absorber casing 24 and extends out of the upper end of the shock absorber casing. Secured to the upper end of rod 22 is a flanged spring retainer cap 27 held on the upper end of the rod by a nut 28.

With reference to Fig. 2 wherein the shock absorber mechanism is illustrated in greater detail, casing 24 of the shock absorber comprises an upper end section 31, a lower bell-shaped section 32, a cylindrical outer tube section 33 threadably inserted into upper section 31 and bell-shaped section 32, and an inner tube section 34 affixed within the interior of the casing in a manner to be described below. Bell-shaped section 32 has a rounded bottom end which fits into and rolls within cupped bracket 23 in a manner similar to a ball-and-socket joint. Section 32 is also provided at its upper end with a flange which seats the lower end of a compression spring 37 interposed between the bell-shaped housing and spring retainer cap 27. Compression spring 37 is compressed between the flange and cap 27, thereby tending to force the cap together with rod 22 upwardly relative to the casing.

In practice, nut 28 is adjusted on the upper end of rod 22 so that the compression of compression spring 27 exerts a force upwardly on the rod member almost equal to but somewhat less than the force exerted downwardly on the rod member by the weight of the saw mechanism described hereinabove. In this manner, when a piece of lumber passes beneath rider wheel 37 and circular saw 6 is attached to the rider wheel so that the entire assembly rises to permit the lumber to pass beneath the assembly, only a small amount of force need be exerted upwardly on the rider wheel to raise the assembly from the piece of lumber.

Referring again to Fig. 2, rod member 22 is slidably received within bell-shaped section 32 and upper end section 31, passing through a gland member 40 fitted within an accommodating bore 41 in section 32 and a bore 42 provided in upper end section 31. Oil seals 43 and 44 are included about rod member 22 for sealing hydraulic fluid within the casing while enabling the rod member to reciprocate freely in the casing.

Bell-shaped section 32 is provided with a central hub portion 45. An annular support flange 46 formed in the upper end of hub portion 45 provides a seat for the lower end of inner tube section 34. The lower end of the tube section is forced against support flange 46 by tightening end section 31 downwardly on the outer tube section so that the central web structure of section 31 presses downwardly on the upper end of tube section 34. The upper end of inner tube section 34 is spaced inwardly of outer tube section 33 by means of collar 47 press fitted about the inner tube section and spaced outwardly of rod member 22 by collar 48 press fitted within bore 42.

The interior of hub portion 45 of bell-shaped section 32 contains an enlarged cylindrical cavity 51 and beneath cavity 51 a more constricted cylindrical bore section 52. Passages 56 formed in hub portion 45 communicate at their upper ends with the annular space lying between the inner and outer tube sections and at their lower ends with bore section 52.

Encircling rod member 22 and affixed to the rod member for reciprocal movement within the casing with the rod member is an annular piston element 57. In the embodiment illustrated, the piston element is affixed to the rod member by means of pin 58 and snap ring 59.

Encircling the rod member, and freely movable on the rod member for movement axially thereof, is a valve member or part 61, partially broken away in Fig. 2. As illustrated in Fig. 2, valve member 61 has generally the configuration of a conical frustum, having an expanded lower end and a more restricted upper end. Lug portions or abutment members 62 project outwardly of the upper end of the valve member, these lug portions having upper surfaces defining a support plane. The lower end of the valve member has a slightly larger diameter than that of bore section 52 so that the valve member seats on shoulder 63 defined between cavity 51 and bore section 52.

Extending through the walls of inner tube section 34 at spaced intervals longitudinally along the tube section are a series of fluid return passages 66. These passages are spaced at regular intervals and connect the interior of the inner tube section with the annular space between the inner and the outer tube sections. It will be noted that the fluid return passage farthest removed from valve part 61 has the greatest size, and the size of each succeeding fluid return passage becomes progressively smaller. Furthermore, it should be noted that all the fluid return passages are sealed off from cavity 62 by piston element 57 when the piston element occupies its base or rest position and abuts lug portions 62, as illustrated in Fig. 2.

On one side of bell housing section 32 connecting valve cavity 51 with fluid passage 56 is a small bore 71. Inserted into an accommodating bore provided in bell-shaped section 32 with its tapered end axially aligned with bore 71 is an adjustable screw 72. Screw 72 is mounted in the bell-shaped section by means of washer 73 and jam nut 74. Bore 71 provides a passage between the valve cavity and passage 56 communicating with the annular space between the inner and outer tube sections. By adjusting the screw, the size of the passage may be made larger or smaller as desired.

In operation, the annular space and passages of the device are first filled with oil to the level approximately indicated by the dotted line 75 in Fig. 2. This is facilitated by including within upper end section 31 an oil cup 76. A plug 77 may also be included in outer tube section 33.

When the dependently supported work mechanism, illustrated herein as a saw mechanism, is at its lowered or rest position, rod 22 dependently supporting the saw mechanism is pulled downwardly within the casing of the shock absorber mechanism to its base or lowered position. This position of the parts is indicated in Fig. 2. The lower limit position of rod member 22 is determined by the lower edge of piston element 57 striking abutment lugs 62 of the valve part which in turn is seated on shoulder 63. Compression spring 37 is adjusted so as to exert an upward force on cap 27 and rod member 22 almost sufficient to raise the saw mechanism against the gravitational pull exerted thereon.

When an upward dislocating thrust is exerted on the saw mechanism, caused by the rider wheel and saw riding over a piece of lumber, rod 22 is moved upwardly within the casing, moving piston 57 upwardly inside inner tube section 34 which defines a piston chamber for the piston element. Upward movement of the piston element creates a decreased pressure in valve cavity 51 with a corresponding flow of fluid through passages 56 and bore section 52 into the valve cavity and thence upwardly into the piston chamber. It will be noted that passages 56 are relatively large so that the flow of fluid upwardly into the piston chamber will be relatively uninhibited.

When the dislocating force is removed from the saw mechanism, as when the saw mechanism passes over the piece of lumber, the weight of the saw mechanism exerted downwardly on rod 22 causes piston element 57 to move downwardly within the piston chamber. Ordinarily, valve part 61 moves downwardly to seat on shoulder 63 by gravitational pull soon after piston 57 ceases upward movement. If the valve part is not yet seated on the shoulder when the piston element starts to move downwardly, the diverging outer surface of the valve part acts as a pressure shoulder for the hydraulic fluid so that the fluid forces the valve part into seated position. The valve part, when seated, closes off bore section 52 so that the exhaust of fluid from the piston chambers takes place either through fluid return passages 66, or through bore 71 which acts as a metering valve means controlling the flow of fluid from the valve cavity.

Initially, due to the number of relief passages opened to the interior of the piston chamber below the piston element, the flow of fluid from the piston chamber is relatively fast. However, as the piston element moves downwardly within the piston chamber, increasingly smaller holes remain for the exhaust of fluid from the chamber and consequently the fluid flow rate decreases. After the piston element is moved past the last of passages 66, the flow of fluid from the piston chamber occurs entirely through leakage past the valve part or through the metering valve means. By providing a series of relief passages which diminish in size, a progressively increasing resistance to the flow of fluid is provided as compared to the more or less constantly increasing resistance to fluid flow which would occur if the bores were all of the same size.

The gap around the tapered end of adjustable screw 72 ordinarily is adjusted so that it is relatively small compared to the diameters of holes 66. While this gap augments the flow of fluid occurring through all the holes exposed to the underside of piston element 57, it has its greatest proportional effect with the smaller holes which are located downwardly in the piston chamber near valve cavity 51. Thus, holes 66 define discharge passages offering a progressively increasing resistance to the exhaust of fluid from the piston chamber as piston 57 approaches the valve cavity, and this progressive increase may be diminished by adjusting screw 11 so as to open up bore 71.

It is claimed and desired to secure by Letters Patent:

1. A shock absorbing device comprising an elongated casing, said casing having interior wall portions defining an elongated piston chamber centrally in said casing, a valve cavity communicating with and adjacent said piston chamber, and an annular fluid reservoir encircling said piston chamber, a rod member extending into said piston chamber and through said valve cavity mounted for reciprocation relative to said casing, a valve part encircling said rod member mounted in said valve cavity, said valve part being freely movable on said rod member axially thereof, said valve cavity accommodating reciprocation of said valve part within said valve cavity between an open and a closed position, wall portions of said casing defining a fluid delivery passage means between said fluid reservoir and said valve cavity closed by said valve part when said valve part occupies its closed position and opened to said valve cavity when said valve part moves away from its closed position, abutment means on said valve part, a piston element encircling said rod member and slidably mounted in said piston chamber for reciprocation with said rod member, said piston element moving between a position spaced longitudinally from said valve part and a position determined by said piston element striking said abutment means of said valve part with said valve part in its closed position, and a series of fluid return passages each connected at their outlet ends to said fluid reservoir with their inlet ends spaced at intervals longitudinally along said piston chamber, said piston element drawing fluid inwardly past said valve part into said piston chamber upon movement away from said valve part and forcing fluid outwardly through said return passages upon movement toward said valve part.

2. A shock absorbing device comprising an elongated casing, said casing having interior wall portions defining an elongated piston chamber centrally in said casing, a valve cavity communicating with and adjacent said piston chamber, and an annular fluid reservoir encircling said piston chamber, a rod member extending into said piston chamber and through said valve cavity mounted for reciprocation relative to said casing, an annular valve part encircling said rod member and freely movable thereon mounted in said valve cavity, said valve cavity accommodating reciprocation of said valve part within said valve cavity between an open and a closed position, wall portions of said casing defining a fluid delivery passage means between said fluid reservoir and said valve cavity closed by said valve part when said valve part occupies its closed position and opened to said valve cavity when said valve part moves away from its closed position, abutment means on said valve part, a piston element fixed to said rod member and slidably mounted in said piston chamber for movement between a position spaced longitudinally from said valve part and a position determined by said piston element striking said abutment means of said valve part with said valve part in its closed position, and fluid return passage means connecting said reservoir with said piston chamber, said piston element drawing fluid inwardly past said valve part into said piston chamber upon movement away from said valve part and forcing fluid outwardly through said return passage means upon movement toward said valve part.

3. A shock absorbing device for mounting mechanism dependently supported thereon and loading said device comprising a casing having interior wall portions defining an elongated piston chamber and a valve cavity communicating with and adjacent said piston chamber, a rod member extending through said piston chamber and valve cavity and mounted for reciprocation relative to said casing, the outer ends of said rod member extending beyond said casing, one of said ends carrying said dependently supported mechanism, a valve part encircling said rod member and freely movable thereon mounted in said valve cavity, said valve cavity accommodating reciprocation of said valve part within said valve cavity between an open and a closed position, a fluid reservoir, a fluid delivery passage means between said fluid reservoir and said valve cavity closed by said valve part when said valve part occupies its closed position and opened to said valve cavity when said valve part moves away from its closed position, a piston element fixed to said rod member and slidably mounted in said piston chamber for reciprocation with said rod member, said piston element moving between a position spaced longitudinally from said valve part and a position adjacent said valve part, spring means interposed between said casing and rod member operable to urge said rod mmber in a direction opposed by the loading of said dependently supported mechanism, and a series of fluid return passages each connected at their outlet ends to said fluid reservoir with their inlet ends spaced at intervals longitudinally along said piston chamber, said piston element drawing fluid inwardly past said valve part into said piston chamber upon movement away from said valve part and forcing fluid outwardly through said return passages upon movement toward said valve part.

4. A shock absorbing device supporting dependent mechanism against a gravitational force exerted downwardly on said mechanism comprising an elongated casing, said casing having interior wall portions defining an elongated piston chamber centrally in said casing, a valve cavity communicating with and adjacent said piston chamber, and an annular fluid reservoir encircling said piston chamber, a rod member extending into said piston chamber and through said valve cavity mounted for reciprocation relative to said casing, one end of said rod member extending beyond said casing, and carrying said dependent mechanism, a valve part encircling said rod member and freely movable thereon mounted in said valve cavity, a fluid delivery passage means between said fluid reservoir and said valve cavity closed by said valve part when said valve part occupies its closed position and opened to said valve cavity when said valve part moves away from its closed position, abutment means on said valve part, a piston element fixed to and encircling said rod member and slidably mounted in said piston chamber for reciprocation with said rod member, said piston element moving between a position spaced longitudinally from said valve part and a position determined by said piston element striking said abutment means of said valve part with said valve part in its closed position, and a series of fluid return passages each connected at their outlet ends to said fluid reservoir with their inlet ends spaced at intervals longitudinally along said piston chamber, said piston element drawing fluid inwardly past said valve part into said piston chamber when moving with said rod member in a direction opposed by the gravitational force exerted downwardly on said dependent mechanism and forcing fluid outwardly through said return passages upon moving with said rod member in the opposite direction.

5. The combination of a frame, a work mechanism, and shock absorbing mechanism interposed between said frame and work mechanism dependently supporting the latter on said frame against a gravitational force exerted downwardly on said work mechanism, said shock absorbing mechanism comprising an upright casing mounted on said frame having inner walls defining an elongated piston chamber and an annular fluid reservoir encircling said piston chamber, a rod extending through both ends of said casing having a piston portion joined thereto intermediate its ends mounted for reciprocation in said piston chamber, fluid delivery passage means having a unidirectional valve connecting said reservoir and the base of said piston chamber, said valve accommodating the flow of fluid from said reservoir to said piston chamber, a series of fluid return passages with inlet ends spaced along the length of said piston chamber connecting said piston chamber and reservoir, successive return passages having increasing size progressing upwardly from the base of said piston chamber, means connecting one end of said rod to said work mechanism with the gravitational force exerted on said work mechanism urging said piston toward the base of said piston chamber, and spring means interposed between the other end of said rod and said casing urging said rod and piston in the opposite direction.

6. The combination of claim 5 which further comprises metering valve means connecting said reservoir with said piston chamber at a point spaced below the lowermost of said fluid return passages.

7. In a shock absorbing mechanism having a casing with inner wall portions defining a piston chamber and a fluid reservoir, a piston mounted for reciprocation in said piston chamber, a rod member joined to said piston extending out from at least one end of said casing, and a series of fluid return passages connecting said piston chamber to said reservoir with the inlet ends of the passages spaced along the length of said piston chamber, the improvement comprising a valve cavity at said one end of said piston chamber in communication with said piston chamber, a valve part encircling said rod member mounted in said valve cavity, a fluid delivery passage means between said fluid reservoir and said valve cavity closed by said valve part when said valve part occupies a closed position and opened to said valve cavity when said valve part moves away from its closed position, and abutment means on said valve part facing said piston, said abutment means defining a limit position for said piston at said one end of said casing when said valve part is in said closed position.

References Cited in the file of this patent

UNITED STATES PATENTS

| | | |
|---|---|---|
| 1,307,502 | Knudson | June 24, 1919 |
| 1,494,135 | Robison et al. | May 13, 1924 |
| 1,575,973 | Coleman | Mar. 9, 1926 |
| 2,004,539 | Rossman | June 11, 1935 |
| 2,173,574 | Binder et al. | Sept. 19, 1939 |
| 2,711,197 | De Koning | June 21, 1955 |

FOREIGN PATENTS

| | | |
|---|---|---|
| 600,899 | France | Nov. 21, 1925 |
| 486,205 | Great Britain | June 1, 1938 |